United States Patent [19]
Ojima

[11] 3,788,164
[45] Jan. 29, 1974

[54] TRANSFER GEAR ASSEMBLY
[75] Inventor: Kenji Ojima, Toyota, Japan
[73] Assignee: Aisin Seiki Kabushiki Kaisha, Kariya City, Aichi Pref., Japan
[22] Filed: June 28, 1972
[21] Appl. No.: 267,186

[30] Foreign Application Priority Data
July 7, 1971    Japan................................ 46/050613

[52] U.S. Cl.................... 74/665 T, 74/333, 74/358
[51] Int. Cl........................ F16h 37/06, F16h 3/08
[58] Field of Search 74/665 G, 665 GA, 665 T, 358, 74/333, 475

[56]          References Cited
          UNITED STATES PATENTS
2,173,044   9/1939   Ruggles et al. .................. 74/333 X
2,579,554   12/1951  Davis............................... 74/333 X
2,397,587   4/1946   Armantrout............... 74/665 GA X Primary Examiner—Arthur T. McKeon
Attorney, Agent, or Firm—Pierce, Scheffler & Parker

[57]          ABSTRACT

A transfer gearing assembly for a vehicle which provides a plurality of different speed ratio power trains, more particularly, only rear wheels drive and both front wheels and rear wheels drive selectively. The present invention particularly resides in improvement of two clutch means for connecting the input shaft with the output shafts or releasing it therefrom so that the operation of one of said two clutch means with a single manual actuation may cause the operation of the other clutch means.

6 Claims, 9 Drawing Figures

TRANSFER GEAR ASSEMBLY

BACKGROUND OF THE INVENTION

This invention relates to a transmission mechanism, more particularly to a transfer gearing assembly for driving both front and rear wheels of a vehicle in a low or high speed range.

In the heavy truck or the special vehicle, it is frequently necessary that the drive will be transmitted to the four rear wheels at a good traction area and the drive will be transmitted to both the front and rear wheels of the vehicle at a poor traction area. In order to complete the shifting operation from the rear wheels drive to all the wheels drive and vice versa, there has been proposed a transfer gear assembly in which two clutches are required to operate simultaneously with a single operation. It will be easy to operate one of said clutches associated with an input or drive shaft since this shaft can be released from the drive source such as an internal combustion engine by a well known friction clutch assembly. However, it will be very difficult to operate the other clutch since output or driven shafts to which the other clutch is operatively connected are loaded. More specifically, the splines on the other clutch are unlikely to engage the splines on the output shafts.

Conventionally, there have been proposed two independent members for operating two clutches independently, or means for providing a phase difference between two clutches by using hydraulic or pneumatic pressure and a spring force, in order to overcome this difficulty.

However, the conventional transfer assembly equipped with these members or means is obliged to be complicated, oversized, and expensive.

SUMMARY OF THE INVENTION

Accordingly, it is an object of the invention to provide a transfer gearing assembly which may be selectively controlled to provide the rear wheels drive and all the wheel drive, and more particularly it is an object of the invention to provide a transfer assembly in which only the rear wheels are driven when the transmission is set for high speed ratio and both the front and rear wheels are compelled when the transmission is conditioned for low speed ratio.

It is another object of the invention to provide a transfer assembly in which a drive transfer operation may be completed by compact operating means without requiring the complicated operating means, more particularly, two clutches may be synchronized by simple synchronizing means.

It is a further object of the invention to provide a transfer gearing assembly in which a drive transfer operation may be accomplished with a single manual operation.

Other objects and features of the invention will become apparent from a consideration of the following description which proceeds with reference to the accompanying drawings.

DETAILED DESCRIPTION OF THE INVENTION

Figure 1:
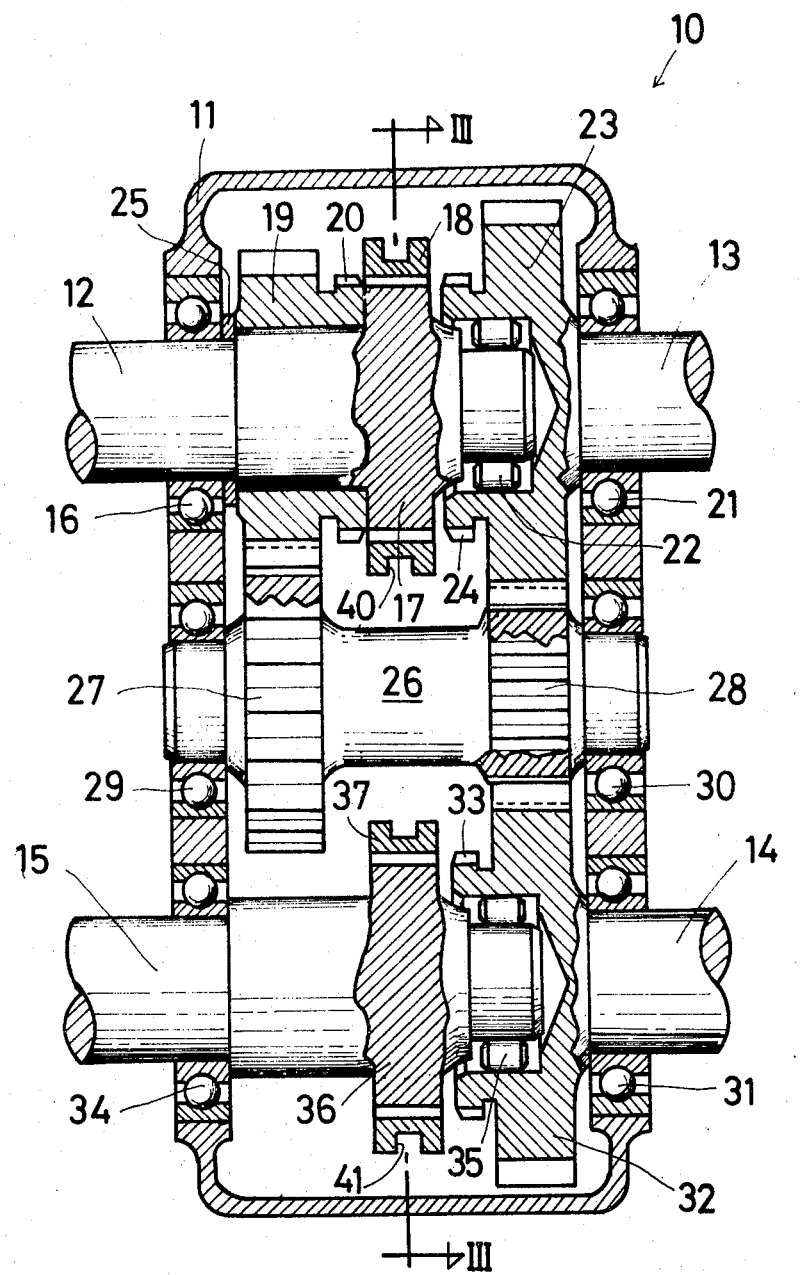
FIG. 1 is a fragmentary sectional view taken through the axes of the input and output shafts of a transfer gearing assembly according to the invention.

Referring to FIG. 1, there is illustrated diagrammatically a transfer assembly generally indicated at the numeral 10. The transfer assembly 10 comprises a housing 11, an input shaft 12, a first output shaft 13, a second output shaft 14, and a third output shaft 15. The input shaft 12 is connected to the driving engine (not shown) of the automotive vehicle and journaled in the housing 11 by suitable anti-friction bearings 16. The input shaft 12 comprises an outer-splined shoulder portion 17 on which an internally splined sleeve 18 is axially slidably mounted. A gear 19 provided with clutch teeth 20 is mounted for free rotation on the input shaft 12. Therefore, when the first sleeve 18 is moved from the position illustrated in FIG. 1 to the left, the sleeve 18 is brought into engagement with the teeth 20 thereby permitting the gear 19 to rotate with the input shaft 12. The first output shaft 13 is journaled in the housing 11 by suitable anti-friction bearings 21 and connected with the rear wheels of the vehicle (not shown). The input shaft 12 is piloted in the output shaft 13 by roller bearings 22. The first output shaft 13 is provided with a gear 23 and clutch teeth 24 at its outer periphery. The pitch diameter of the gear 23 is larger than that of the gear 19, as shown. When the sleeve 18 is moved to the right, the sleeve 18 is brought into engagement with the teeth 24 thereby permitting rotation of the first output shaft 13 in unison with the input shaft 12. The numeral 25 represents a thrust washer provided between the bearings 16 and the gear 19. Intermediate the first output 13 and the second output 14, a counter shaft 26 is provided with a first gear 27 adapted to mesh with the gear 19 and a second gear 28 adapted to mesh with the gear 23. Each end of the counter shaft 26 is journaled by bearings 29 or bearings 30.

The second output shaft 14 is journaled by suitable anti-friction bearings 31 and provided with a gear 32 and clutch teeth 33 at its outer periphery. This shaft 14 is connected to the rear wheels. The gear 32 is of the same pitch diameter as the gear 23 and adapted to mesh with the second gear 28 of the counter shaft 26.

The third output shaft 15 is journaled in the housing 11 by anti-friction bearings 34 and mounted for free rotation on the second output shaft 14 by suitable roller bearings 35. The third output shaft 15 is connected to the front wheels of the vehicle (not shown) and comprises an enlarged shoulder 36 the outer periphery of which is splined. A second sleeve 37 is internally splined and mounted axially slidably on the shoulder 36 of the third output shaft 15.

Therefore, when the second sleeve 37 is moved to the right, the second sleeve 37 is brought into engagement with the clutch teeth 33 thereby permitting the third output shaft 15 to rotate with the second output shaft 14. It should be recognized that the movement of the first and second sleeves 18 and 37 is controlled by a single operating means so that the left movement of the first sleeve 18 causes the right movement of the second sleeve 37 and the right movement of the first sleeve 18 causes the left movement of the second sleeve 37.

To summarize the above rotational operation of the output shafts, when the first sleeve 18 is moved to the left from the neutral position as shown in FIG. 1, the second sleeve 37 is moved to the right from the neutral position. Therefore, the first, second, and third output shafts 13, 14, 15 are caused to rotate together. When the first sleeve 18 is moved to the right, the second sleeve 37 is moved to the left. Therefore, the first and second output shafts 13 and 14 are caused to rotate while the third output shaft 15 is not driven by the input shaft 12.

Figure 2A:
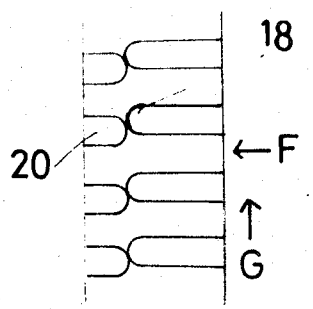
FIG. 2(A)-2(E) are schematic views showing stages of the principal portions of the transfer gearing assembly.

When the first sleeve 18 is moved to the left, the conventional clutch assembly (not shown) has been released. Accordingly the input shaft 12 is in a free-rotational condition so that the first sleeve 18 splined on the input shaft 12 is also in a free-rotational condition. Thus, it is sure that the first sleeve 18 can engage the clutch teeth 20 at any relative position of the sleeve 18 and the clutch teeth 20. Referring to FIG. 2(A) in which the above operation in schematically illustrated, when the sleeve 18 is moved in the direction indicated by the character F even in a position as illustrated, the sleeve 18 can mesh with the teeth 20 since the sleeve 18 is permitted to move in the direction indicated by the character G.

Figure 2B:
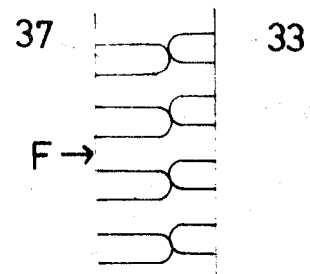

However, the problem resides in the right movement of the second sleeve 37 because the second and third shafts 14 and 15 are connected to the loaded portions, in other words, they are not in a free-rotational condition. If the relative position of the second sleeve 37 and the clutch teeth 33 is like as shown in FIG. 2(B), the movement of the second sleeve 37 in the direction F is locked by the clutch teeth 33.

Figure 3:
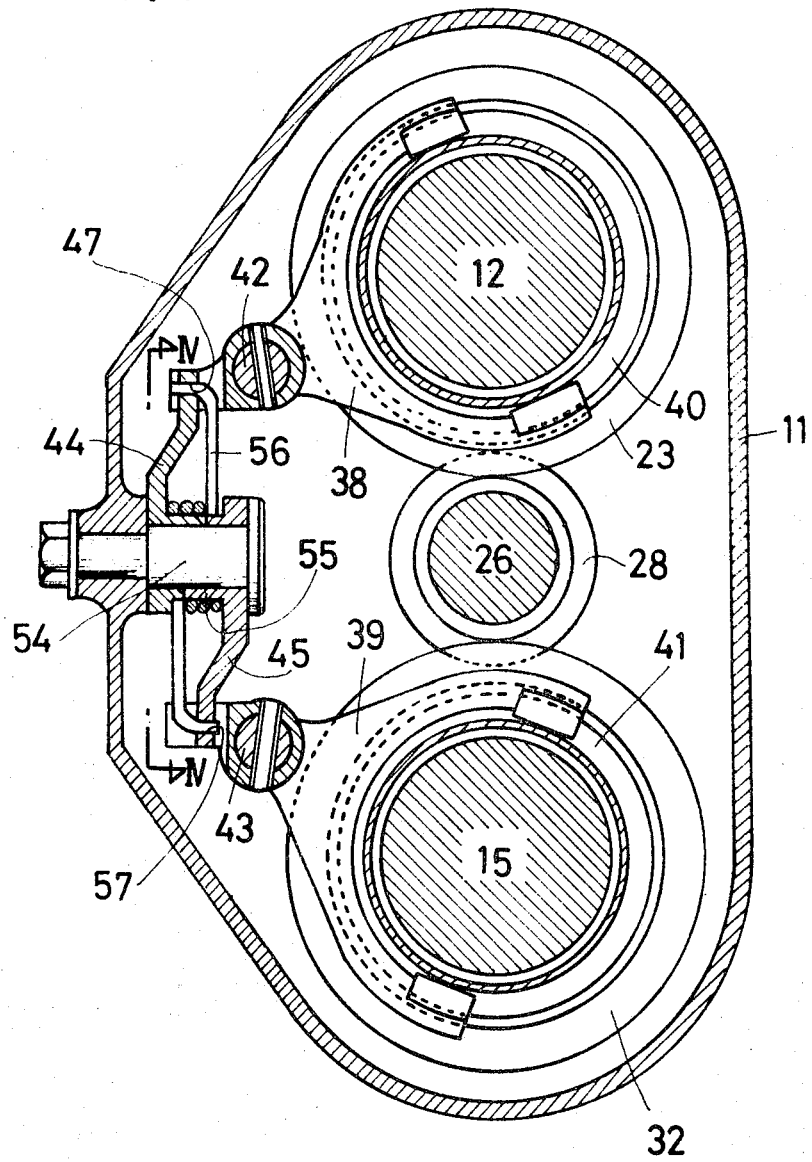
FIG. 3 is a sectional view taken through a line III—III of FIG. 1 and showing gear teeth in a simplified way.
Figure 4:
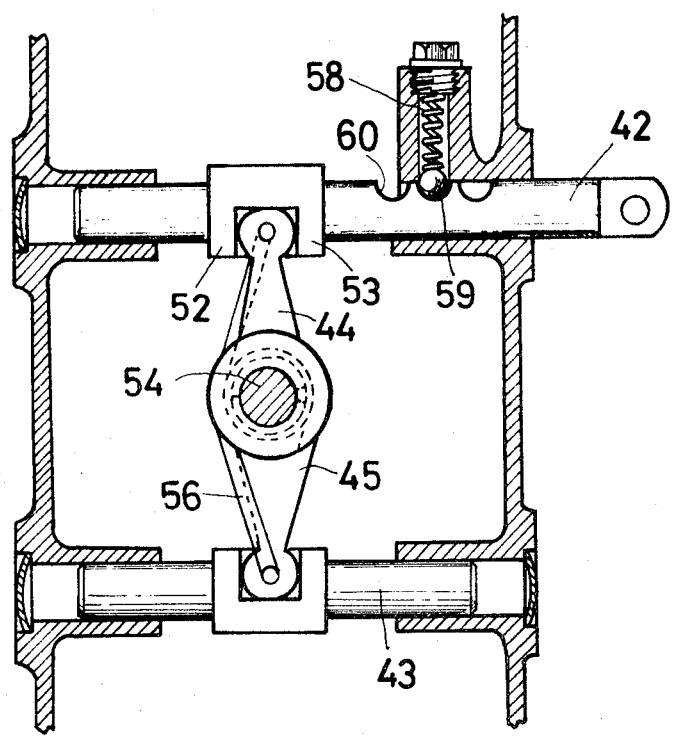
FIG. 4 is a sectional view taken through a line IV—IV of FIG. 3.
Figure 5:
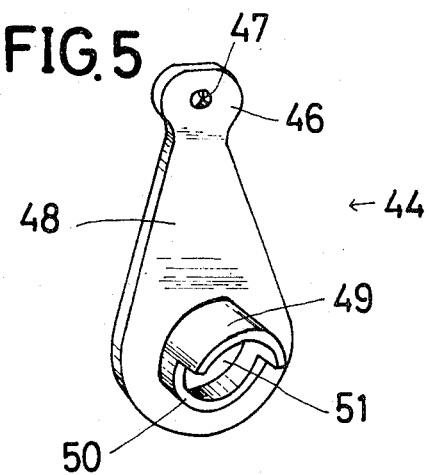
FIG. 5 is a perspective view of one of the principal members of the invention.

This invention provides means for overcoming this drawback and shifting the first and second sleeves 18 and 37 in a single operation. Referring to FIGS. 3 and 4 wherein the invention is clearly shown, a pair of fork members 38 and 39 are adapted to engage a groove 40 on the first sleeve 18 and a groove 41 on the second sleeve 37, respectively. Each fork member is fixed to a slidable rod 42 or 43. The rod 42 is mechanically connected to the manual shifting mechanism (not shown) thereby to be moved in the horizontal direction (FIG. 4). The movement of the rod 42 is transmitted to the rod 43 through a pair of linking or connecting arm members 44 and 45. The arm members 44 and 45 are formed into the same construction to each other and fitted in an inverted manner and in face to face. The arm member 44 is formed substantially into a guitar shape as seen in FIG. 5 and comprises a head 46 provided with a hole 47, a main body 48 provided with a first annular projection 49 and a second annular projection 50, and a central hole 51 surrounded by the projections 49 and 50. The head 46 is adapted to be stuck in a pair of projections 52 and 53 of the rod 42. A pin 54 is passed through the central holes of the connecting arm members 44 and 45 and is secured to the housing 11. The circumferential angle of the first annular projection 49 is adapted to be smaller than that of the second annular projection 50, namely, is formed within 180 degree so that when the arm members 44 and 45 are fitted the circumferential clearance will be provided between the first annular projection 49 of the arm 44 and a first annular projection 55 of the arm 45.

A torsion spring 56 is coiled around the annular first and second projections of the fitted arms 44 and 45. One end of the spring 56 engages the hole 47 of the arm member 44 while the other end thereof engages a hole 57 of the arm member 45. The torsion spring 56 urges the connecting arms 44 and 45 to provide the said clearance therebetween. In FIG. 4, when the rod 42 is shifted in the right direction while the rod 43 is kept immovable, the arm member 44 is rotated around the pin 54 within the range of the circumferential clearance due to the torsion spring 56. Therefore, no mechanical force is applied to the arm member 45. The torsion spring 56 is twisted thereby storing the urging force to move the fork member 39 in the left direction (FIG. 4).

There is provided a coil spring 58 for locating a ball 59 in one of recesses 60 provided on the rod 42. It should be noted that the biasing force of the coil spring 58 is greater than the stored urging force of the torsion coil spring 56.

Figure 2C:
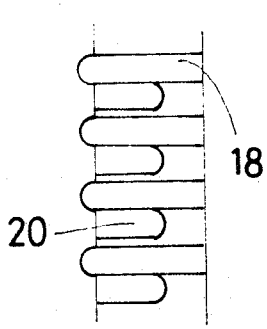
Figure 2D:
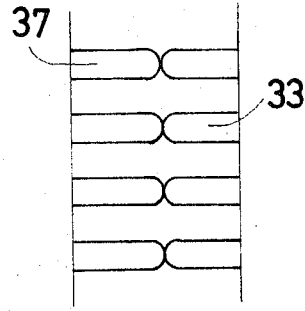
Figure 2E:
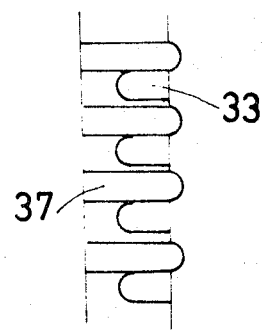

More specifically, when the rod 42 is moved to the right in FIG. 4, the first sleeve 18 is caused to move through the fork member 38 in the left direction (FIG. 1) thereby resulting in engagement with the clutch teeth 20 of the gear 19 as shown in FIG. 2(C). Simultaneously the rod 43 is urged to move in the left direction through the torsion coil spring 56. If the relative position of the second sleeve 37 and the clutch teeth 33 is like as shown in FIG. 2(D), the rod 43 will not be moved but the torsion coil spring 56 is kept twisted to store its urging force on the fork member 39. In this condition, when either one of the second output shaft 14 or the third output shaft 15 is rotated in some angles such as by the movement of the vehicle, the second sleeve 37 will be engaged with the clutch teeth 33 by the urging force of the torsion coil spring 56 having been stored as seen in FIG. 2(E). Thus the second and third output shafts 14 and 15 are operatively connected to each other through the second sleeve 37.

When the rod 42 is moved from the above position to its neutral position, the both arms 44 and 45 are rotated around the pin 54 in a unit through the first annular projections 49 and 55 thereof. Accordingly any objectionable twisting force is not applied to the torsion coil spring 56. The rod 43 is thus shifted to its original position as shown in FIG. 4. As to the urging force or set load of the torsion coil spring 56 in the neutral position as shown in FIG. 4, it is preferable to set some residual load in the spring 56 so that one of the first annular projections 49 and 55 is kept in contact with the other annular projection thereby eliminating any rattle or clatter produced during the neutral condition.

I claim:

1. A transfer gearing assembly for a vehicle having front wheels and rear wheels; comprising
   an externally splined input shaft;
   a first output shaft for driving the rear wheels and being provided with outer teeth;
   a first clutch provided between said input shaft and said first output shaft and being internally splined to be engageable with the external splines of said input shaft and the teeth of said first output shaft,
   shifting means mechanically connected to said first clutch for moving it along said external splines, said first clutch including a first sleeve and means normally engaged with said first sleeve and movable by said shifting means;

a second output shaft for driving the front wheels and being provided with outer teeth;

a second clutch provided between said input shaft and said second output shaft and being internally splined to be engageable with the teeth of said second output shaft, said second clutch including a second sleeve and means normally engaged with said second sleeve and movable with guide means fixed thereto for guiding it;

connecting means provided between said first and second clutches for achieving the unitary movement of both said clutches whereby said second clutch is moved to engage with or release from said second output shaft through said connecting means when said first clutch is moved by said shifting means, said connecting means including a pair of arms, one of which is linked to said shifting means and the other to said guide means, said pair of arms being pivotally connected with each other by a biasing means disposed therebetween; whereby when said first sleeve is moved to a position wherein said second output shaft is not operatively connected with said input shaft, said biasing means is loaded whereby storing its biasing force.

2. A transfer gearing assembly as claimed in claim 1, wherein said biasing means is a torsion coil spring.

3. A transfer gearing assembly as claimed in claim 1, wherein said shifting means is formed in a rod shape on which plural recesses are provided, and includes a locating means for locating said shifting means, said locating means comprising a ball engageable in one of said recesses and a spring for urging said ball thereinto, the force of said spring being greater than that of said biasing means.

4. A transfer gearing assembly as claimed in claim 1, wherein each said arm includes an annular projection the circumferential angle of which is formed within 180°, whereby when said arms are fitted to each other in an inverted manner and in face to face relation, a circumferential clearance is provided between the annular projections.

5. A transfer gearing assembly as claimed in claim 4, wherein each said arm has a central opening encircled by said annular projection, and a pin passes through said central opening to function as a pivot for said arms.

6. A transfer gearing assembly as claimed in claim 4, wherein each said arm includes a head portion, each of said shifting means and said guide means is provided with a fork member to which said head portion of each said arm is rigidly connected.

* * * * *